B. W. FLANDERS.
DEODORIZER.
APPLICATION FILED OCT. 6, 1917.
1,323,462.
Patented Dec. 2, 1919.
2 SHEETS—SHEET 1.
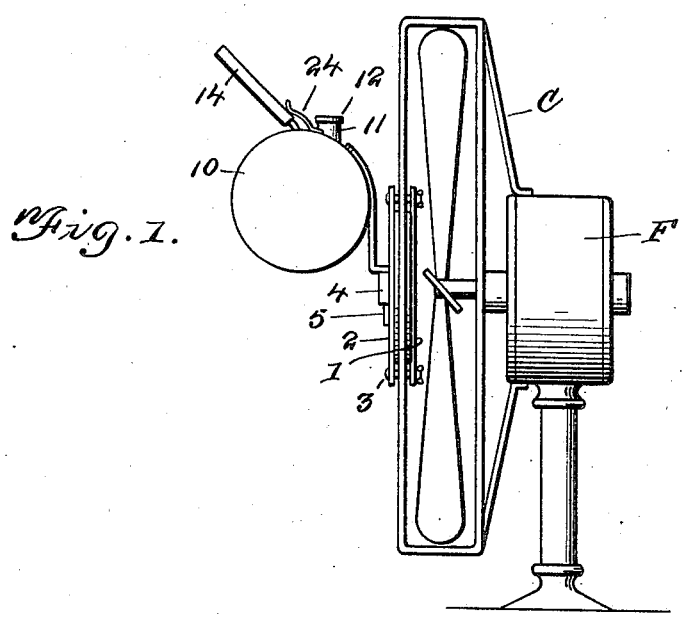
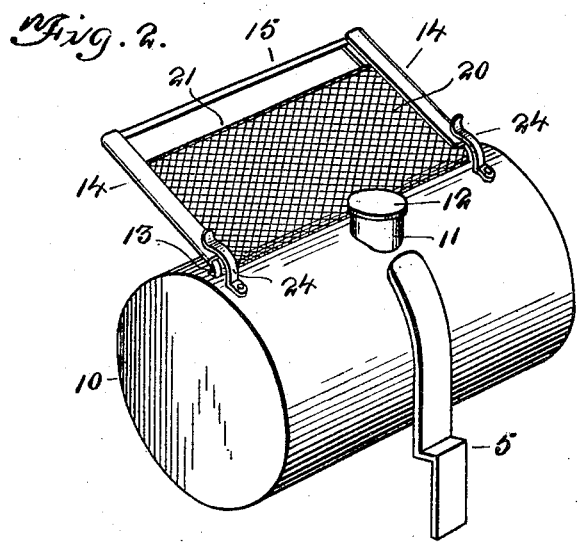
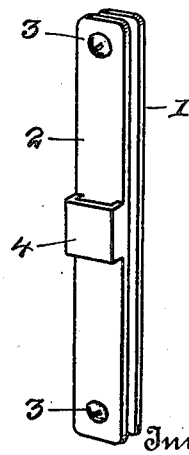
Witnesses
Inventor
B. W. Flanders
By Victor J. Evans
Attorney B. W. FLANDERS.
DEODORIZER.
APPLICATION FILED OCT. 6, 1917.
1,323,462.
Patented Dec. 2, 1919.
2 SHEETS—SHEET 2.
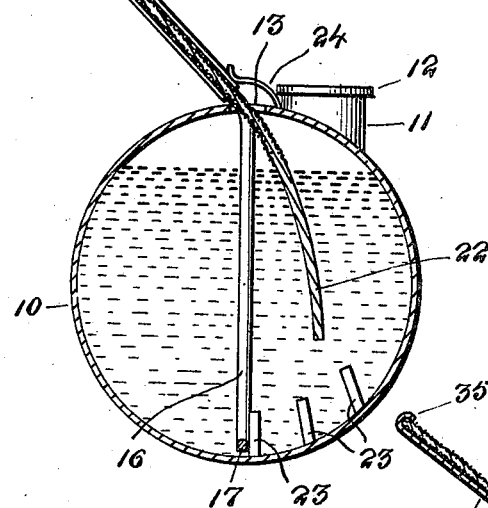
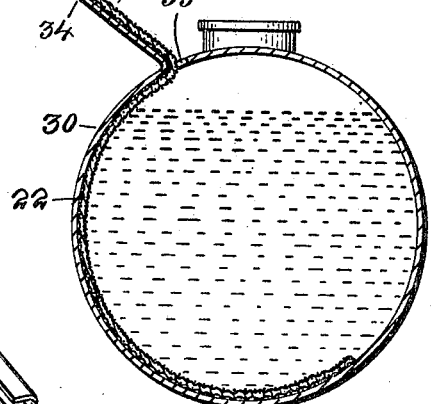
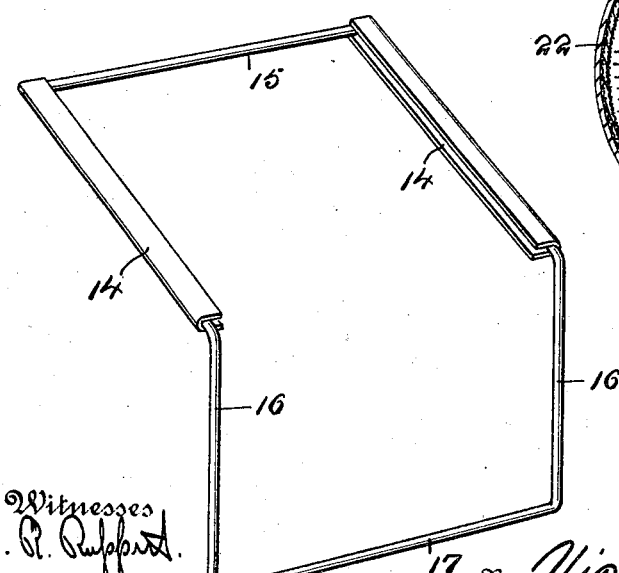
Inventor
B. W. Flanders
By Victor J. Evans
Attorney
Witnesses

UNITED STATES PATENT OFFICE.

BERT W. FLANDERS, OF NEW LONDON, CONNECTICUT, ASSIGNOR TO THE NEW LONDON CHEMICAL COMPANY, OF NEW LONDON, CONNECTICUT, A CORPORATION OF CONNECTICUT.

DEODORIZER.

1,323,462.   Specification of Letters Patent.   Patented Dec. 2, 1919.

Application filed October 6, 1917. Serial No. 195,144.

*To all whom it may concern:*

Be it known that I, BERT W. FLANDERS, a citizen of the United States, residing at New London, in the county of New London and State of Connecticut, have invented new and useful Improvements in Deodorizers, of which the following is a specification.

This invention relates to refrigeration, and more especially to air coolers and deodorizers which include a fan or other source of air supply and means for disposing within the blast of air a wick saturated with a liquid deodorizer or disinfectant.

The invention consists of an attachment adapted to be applied to the cage of an ordinary office or domestic fan, which attachment comprises a cylindrical body or tank for containing the liquid and a peculiarly shaped frame or support for the wick, the upper portion of the latter standing in the path of the air created by the fan and the lower portion hanging within the tank and being constantly moistened by the liquid therein.

Details will be set forth in the following specification, and reference is made to the accompanying drawings in which—

Figure 1 is a side elevation of an ordinary fan with this attachment applied.

Fig. 2 is a perspective view of the attachment on a larger scale, removed from the fan.

Fig. 3 is a central vertical section through the attachment.

Fig. 4 is a perspective view of the frame,

Fig. 5 is a perspective view of the clip.

Fig. 6 is a sectional view showing a slight modification.

In the drawings the letter F designates an ordinary fan and C is the wire guard or cage which usually surrounds the same. I have shown this source of air because my attachment is ordinarily applied thereto, but I would not be limited in this particular. When applied to the cage I use inner and outer plates 1 and 2 disposed respectively inside and outside the front portion of the cage C and connected by bolts or other devices 3 passing through said cage, and the outer plate has a socket 4 into which may be removably inserted a tongue or hook 5 at the inner side of the attachment itself as best shown in Fig. 2. When the attachment is not to be used, it can be lifted out of place in this support. However, it is clear that if the blast of air was supplied by some other means, some other form of support might be conveniently used and doubtless would be employed in the place of the one illustrated and described.

The attachment itself comprises a cylindrical body or tank 10 of appropriate size and material, preferably metal suitably treated to prevent rust and possibly made ornamental on its exterior, the tank being provided with a suitable filling nipple 11 closed by a cap 12, and along the upper side of the tank I form a slot 13. The so-called "frame" best seen in Fig. 4 is made up of two channeled side bars 14 connected across their outer ends by a rod 15, and a yoke whose side arms 16 are connected to the inner ends of the side bars and preferably stand at a slight angle thereto, while its own cross bar 17 stands at a distance below the bends of the arms which is equal to the diameter of the tank. Within this frame is disposed a folder 20 composed of two leaves of reticulated metal such as wire gauze, these leaves being united at their outer edges by a bend 21 and their size being such that they will fill the space between the bars 14 and their edges will rest in the channels thereof. The folder in turn carries the upper or outer end of a wick 22 of fabric such as cheese-cloth or other soft and porous material, the wick being possibly twice the length of the folder. In Fig. 3 I have shown a series of stops 23 within and at the bottom of the tank against which the cross bar 17 of the yoke may rest, and in Figs. 2 and 3 I have shown a pair of springs 24 at the top of the tank bearing on the side bars 14 of the frame when the latter is in position their function being to press this frame forward so as to throw the cross bar 17 of the yoke upward against that stop which is used.

In the assembling of parts, after the tank has been hung on the cage C in a manner which is obvious and its body filled more or less with a disinfectant or with clear water charged with a disinfectant or antiseptic, the wick is inserted in the folder, the folder is placed in the frame, and the yoke at the lower end of the frame is passed downward through the slot 13 at the top of the tank and its cross bar 17 rested against one of the stops 23. In Fig. 3 it is shown as resting against the forward stop, but if the upper part of the frame is to be inclined to a greater degree than there is shown the cross bar 17 will be rested against one of the other stops. The folder is adjusted within the channeled side bars 14 to the desired extent. If slid upward to the rod 15, a considerable portion of the wick will be exposed; if slid downward part way as shown in Figs. 2 and 3, a smaller area of the wick will be exposed. The wick is obviously held between the leaves of the folder, and its lower end hangs within the liquid in the tank, its capillary attraction constantly drawing this liquid upward in a manner which will be readily understood. As the entire attachment hangs on the cage C forward of the fan F or other source of air, the blast of air is against the folder and wick, and a considerable portion of the air may be driven entirely through the saturated upper part of the wick, provided the latter has sufficient porosity. In any event the air will be moistened and deodorized thoroughly before it is delivered to the point of use. The setting of the frame against the stops adjusts the position of its exterior portion and of that part of the wick which stands within the folder, and the adjustment of the folder within the channeled side bars regulates the area of the wick exposed. Therefore these adjustments may be used singly or collectively to impart more or less moisture to the air as circumstances may require.

In the modification shown in Fig. 6, practically the same folder 20 and wick 22 are employed, but the frame instead of being a separate member is made integral with the wall of the tank. Such wall is here numbered 30, slotted near its top as at 33, and just forward of this slot the material of the wall is carried obliquely upward in two channeled side bars 34, preferably connected at their outer ends by a channeled cross bar 35—much the same as the upper portion of the frame shown in Fig. 4. The use of the folder and wick is the same as that described above, excepting that when it is inserted it is necessary to pass the lower end of the wick and the lower end of the folder down into and through the slot 33 to the interior of the tank, and then move the folded end or bend 21 of the folder upward in the channeled side bars 34, either part way or fully until the bend enters the channeled cross bar 35. Manifestly the angle of this frame cannot so easily be adjusted, although adjustment is possible by bending the side bars 34; but manifestly also the folder and the upper portion of the wick can be adjusted by sliding them the same as above described.

What I claim is:—

1. A deodorizer comprising a substantially horizontal tank having a slot along its top, means for supporting the tank within a blast of air, a frame carried by the tank and extending from its slot across the path of said blast, a foraminous folder within the frame, and a wick held at its upper portion in the folder and depending therefrom through said slot into the tank.

2. A deodorizer comprising a substantially horizontal tank having a slot along its top, means for supporting the tank within a blast of air, a frame comprising channeled side bars carried by the tank and extending from its slot obliquely across the path of said blast and means for connecting their outer ends, a foraminous folder adjustably mounted within said side bars, and a wick held at its upper portion in the folder and extending thence through the slot and hanging within the body of the tank.

3. In a deodorizer, the combination with a substantially horizontal tank having a slot along its top and a filling opening, and means on the tank for supporting it within a blast of air; of a frame removably and adjustably mounted within said slot and having the side bars of its exterior portion channeled, a foraminous folder mounted within said channeled side bars, and a wick held at its upper portion in the folder and depending thence through the slot into the tank.

4. In a deodorizer, the combination with a substantially horizontal tank having a slot along its top of a frame comprising at its upper portion a pair of channeled side bars connected at their outer ends by a cross rod, and at its lower portion a yoke consisting of upright side arms standing at an angle to said side bars and a cross bar connecting the lower ends of said arms, the latter being of a length equal to the diameter of said tank, stops within the bottom of the tank against which the cross bar of the yoke may be selectively set, a carrier slidably mounted within said channeled side bars, and a wick held at its upper end in the carrier and depending thence through the slot into the tank.

5. In a deodorizer, the combination with a cylindrical tank standing on a horizontal axis and having a slot along its top, stops rising from the bottom of the tank, and spring fingers adjacent said slot; of a frame whose upper portion is oblique to its lower portion and channeled, the lower portion being of a length equal to the diameter of the tank and adapted at its bottom to rest against one of said stops when the bend of the frame stands within the slot of the body and the upper portion underlies said spring fingers, a foraminous carrier adjustably mounted within the upper portion of the frame, and a wick held at its upper end in the carrier and depending thence through the slot into the interior of the tank.

6. A deodorizer comprising a tank having an opening, a holder extending through said opening and resting partly within and partly without the tank, an absorbent element carried by the said holder and extending within and without the tank, and means complementary to the tank for adjustably positioning the holder and the absorbent element at various angles of inclination.

7. In a deodorizer, the combination of a tank having an opening, a holder carried by and extending from the tank and disposed adjacent to the opening thereof, and an absorbent element extending within and without the tank and through the opening thereof and having its exterior portion disposed in the holder.

In testimony whereof I affix my signature.

BERT W. FLANDERS.

Witnesses:
N. L. COLLAMER,
IRA M. COMSTOCK.